United States Patent [19]
Konishi

[11] Patent Number: 5,210,462
[45] Date of Patent: May 11, 1993

[54] FLAT PANEL DISPLAY APPARATUS AND A METHOD OF MANUFACTURING THEREOF

[75] Inventor: Morikazu Konishi, Kanagawa, Japan

[73] Assignee: Sony Corporation, Tokyo, Japan

[21] Appl. No.: 815,061

[22] Filed: Dec. 30, 1991

[30] Foreign Application Priority Data

Dec. 28, 1990 [JP] Japan ................................. 2-417501
Dec. 28, 1990 [JP] Japan ................................. 2-417502

[51] Int. Cl.⁵ .......................... H01J 19/24; H01J 29/18
[52] U.S. Cl. ........................... 313/495; 313/309; 313/312; 313/336; 313/351; 313/461
[58] Field of Search ............... 313/309, 311, 312, 336, 313/351, 355, 495, 408, 461

[56] References Cited

U.S. PATENT DOCUMENTS

| | | | |
|---|---|---|---|
| 3,467,878 | 9/1969 | Newberry | 313/309 X |
| 3,665,241 | 5/1971 | Spindt et al. | 313/351 |
| 4,818,914 | 4/1989 | Brodie | 313/336 X |
| 5,063,323 | 11/1991 | Longo et al. | 313/309 |

Primary Examiner—Donald J. Yusko
Assistant Examiner—Ashok Patel
Attorney, Agent, or Firm—Hill, Steadman & Simpson

[57] ABSTRACT

In a flat panel display using a field emission type cathode array, a flat fluorescent screen is arranged between a cathode array formed on a flat substrate and a screen comprising a glass plate having a convex curved shape in parallel with the substrate. A vacuum is present in a space between the fluorescent screen and the cathode array and the space between the fluorescent screen and the substrate.

3 Claims, 4 Drawing Sheets

FLAT PANEL DISPLAY APPARATUS AND A METHOD OF MANUFACTURING THEREOF

BACKGROUND OF THE INVENTION

1. Field of the Invention

The invention relates to a flat panel display apparatus and a method of manufacturing thereof, and, more particularly, the invention is suitable when it is applied to a flat panel display using a field emission type cathode array.

2. Description of the Prior Art

Hitherto, as a flat panel display using a field emission, type cathode array comprising microtips having a size on the order of a micron, a display as shown in FIG. 1 is known.

As shown in FIG. 1, in the conventional flat panel display, a silicon dioxide ($SiO_2$) film 102 having cavities 102a is formed on a conductive flat silicon (Si) substrate 101. Gate electrodes 103 made of molybdenum (Mo), niobium (Nb), or the like are formed on the $SiO_2$ film 102 in the peripheral portions of the cavities 102a. A cathode 104 made of Mo or the like is formed on the Si substrate 101 in the cavity 102a. A fluorescent screen and be which a fluorescent material 106 is formed on the, flat glass plate 105 is arranged so as to face and be parallel with the Si substrate 101 on which the cathode array is formed. The space between the fluorescent screen and the Si substrate 101 is sealed in a state in which it is held in vacuum.

In recent years, the need to provide a large screen of the flat panel display type is becoming strong. The above conventional flat panel display, however, has a structure in which a differential pressure between the atmospheric pressure and the vacuum is held by only the glass plate 105 on which the fluorescent material 106 is formed. It is, accordingly, difficult to simply enlarge the screen from a viewpoint of the strength of the glass plate 105.

To solve the above problem, there is considered a method of realizing a large screen by forming the screen into a spherical shape as shown in FIG. 2, as in the case of the cathode ray tube of an ordinary television receiver. When such a, structure is used, however, the formation of a portion thereof in which a distance between the cathode array and that portion of the fluorescent screen is large cannot be avoided. In the above conventional flat panel display, however, it is necessary to closely arrange the cathode array and the fluorescent screen in terms of operation principle. Therefore, when the screen is simply formed in a spherical shape as mentioned above, a problem occurs in the operation of the flat panel display. To prevent it, there is also considered a method whereby the Si substrate is also formed in a spherical shape and the cathode array is formed on the Si substrate. It is, however, extremely difficult to realize such a structure from a viewpoint of the manufacturing processes.

Therefore, in the flat panel display shown in FIG. 1, there is considered a method whereby pillars are formed at regular intervals between the glass plate 105 and the Si substrate 101, and the differential of pressure between the atmospheric pressure and the vacuum is held by the pillars. When such a structure is used, however, there are problems such that not only the manufacturing processes become complicated but also the cathode 104 cannot be formed on the Si substrate 101 in the portion of the pillar.

From the above reasons, it has been thus difficult so far to realize a large screen of the flat panel display using the field emission type cathode array.

On the other hand, as a method of manufacturing a flat panel display using a field emission type cathode array by microtips of a size on the order of micron order, a method as shown in FIGS. 3A to 3E known. According to the manufacturing method, as shown in FIG. 3A, an $SiO_2$ film 102 is first formed on a conductive Si substrate 101 by, for instance, a thermal oxidation method, a CVD method or a sputtering method. After that, a metal film 107 made of, for example, Mo film, a Nb film, or the like to form gate electrodes is formed onto the $SiO_2$ film 102 by, e.g., a sputtering method or an electron beam evaporation depositing method. Subsequently, a resist pattern 108 having shapes corresponding to the gate electrodes to be formed are formed onto the metal film 107 by a lithography.

The metal film 107 is subsequently etched by a wet etching method or a dry etching method by using the resist pattern 104 as a mask, thereby forming gate electrodes 103 as shown in FIG. 3B. After that, the $SiO_2$ film 102 is etched by a wet etching method or a dry etching method by using the resist pattern 108 and the gate electrodes 103 as masks, thereby forming cavities 102a.

After the resist pattern 108 was removed, as shown in FIG. 3C, an oblique evaporation deposition is executed to the substrate surface by an electron beam evaporation depositing method from the direction which is inclined by a predetermined angle to the substrate surface, thereby forming a peeling-off layer 109 made of, e.g., aluminium (Al) or nickel (Ni), onto the gate electrodes 103. After that, for instance, Mo as a material to form cathodes is evaporation deposited onto the substrate surface by an electron beam evaporation depositing method from a direction perpendicular to the substrate surface. Thus, cathodes (emitters) 104 comprising microtips are formed onto the Si substrate 101 in the cavities 102a. Reference numeral 110 denotes a metal film which has been evaporation deposited onto the peeling-off layer 109.

The peeling-off layer 109 is subsequently removed by a lift-off method together with the metal film 110 formed on the peeling-off layer 109, so that a state shown in FIG. 3D is obtained. After that, as shown in FIG. 3E, a screen in which a fluorescent material 106 is formed on a glass plate 105 serving as a display screen is arranged so as to face the Si substrate 101 on which the cathode array is formed in a manner such that the fluorescent material 106 is positioned on the inside. The space between such a screen and the Si substrate 101 is sealed in a state in which it is held in vacuum. A desired flat panel display is consequently completed.

Upon operation of the flat panel display, a negative voltage of, e.g., about −50 V is applied to each cathode 104.

In the foregoing conventional manufacturing method of the flat panel display, it is extremely difficult to align all of the radii of curvatures of the tips of a number of (for instance, tens of thousand) cathodes 104 which are simultaneously formed by an evaporation depositing method, and the occurrence of a slight variation in the radii of curvatures of the tips of the cathodes 104 can hardly be avoided.

On the other hand, as shown in FIG. 4, there is generally a correlation between the radius of curvature of the tip of the cathode and an allowable applied voltage to the cathode. In FIG. 4, Vmin denotes a minimum voltage (absolute value) at which a current emission can be performed and vmax indicates a maximum voltage (absolute value) at which a current emission can be executed without causing a discharge. As will be understood from FIG. 4, as a radius of curvature of the tip of the cathode increases, a voltage at which the current emission can be performed rises. Therefore, if only one cathode whose radius of curvature of the tip is smaller than those of,, the other cathodes exists, for instance among tens of thousands of cathodes, when a negative voltage is gradually applied to those cathodes whose tip radius of curvature is smaller, a problem arises. The problem is that when the current emission starts from the other cathodes, the voltage exceeds the allowable applied voltage, and those cathodes discharge. Thus the tips thereof are rounded, and the current emission stops.

To solve the above problem, a method whereby a resister is provided between each cathode and a power source to thereby prevent the occurrence of the emission of a predetermined current or higher has also been proposed. There is a problem such that the above method is extremely difficult from a viewpoint of the manufacturing processes.

OBJECTS AND SUMMARY OF THE INVENTION

It is, therefore, an object of the invention to provide a flat panel display apparatus which can realize a large screen.

Another object of the invention is to provide a method of manufacturing a flat panel display apparatus in which radii, of curvatures of the tips of all of the cathodes forming the cathode array can be easily made equal at a high accuracy.

According to an aspect of the invention, there is provided a flat panel display apparatus comprising a cathode array formed on a flat substrate, a screen made of a glass plate having a convex curved shape, and a fluorescent screen which is arranged between the cathode array and the screen so as to be substantially parallel with the substrate. The space between the fluorescent screen and the screen and the space between the fluorescent screen and the substrate comprises a vacuum.

According to the flat panel display apparatus of the invention constructed as mentioned above, since the screen is formed by the glass plate of a convex curved shape, a large screen of the flat panel display can be realized. Moreover, since the space between the fluorescent screen and the screen and the space between the fluorescent screen and the substrate comprises a vacuum, a differential pressure does not substantially exist on both sides of the fluorescent screen. Thus, even when the area of the fluorescent screen is increased in order to realize a large screen, no problem occurs with respect to the strength.

According to another aspect of the invention, there is provided a method of manufacturing a flat panel display apparatus in which a plurality of cathodes are formed on a conductive substrate after the plurality of cathodes are formed, and a predetermined voltage is applied to the plurality of cathodes, thereby causing a field evaporation from the tips of the plurality of cathodes.

According to the manufacturing method of the flat panel display apparatus of the invention constructed as mentioned above, in the case where radii of curvatures of the tips of a plurality of cathodes forming the cathode array are not aligned, when a predetermined voltage is applied to the cathodes, a field evaporation first occurs from the tip of the cathode whose radius of curvature is smallest. That is, atoms on the surface of the tip of such a cathode are eliminated as ions. Due to the field evaporation, the radius of curvature of the tip of the cathode gradually increases. When the radius of curvature of the tip of the cathode coincides with the radius of curvature of the cathode whose tip radius of curvature is as small as a second smallest value, the field evaporation occurs from those cathodes.

As mentioned above, the field evaporation sequentially occurs from the cathode whose tip radius of curvature is small. After the elapse of a predetermined time, the radii of curvatures of the tips of all of the cathodes forming the cathode array are equalized. Due to this, the radii if curvatures of the tips of all of the cathodes forming the cathode array can be easily aligned at a high precision. The field emission from each cathode can be made uniform.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

Embodiments of the invention will be described hereinbelow with reference to the drawings.

Figure 1:
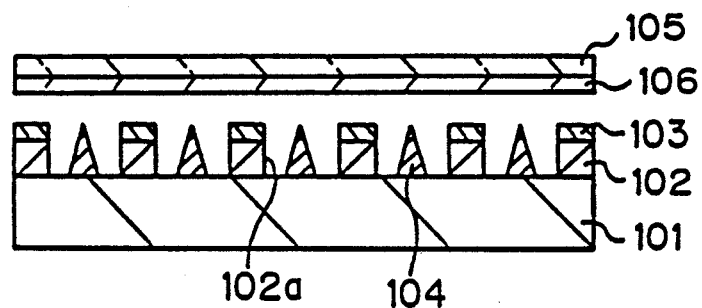
FIG. 1 is a cross sectional view showing a conventional flat panel display.
Figure 2:
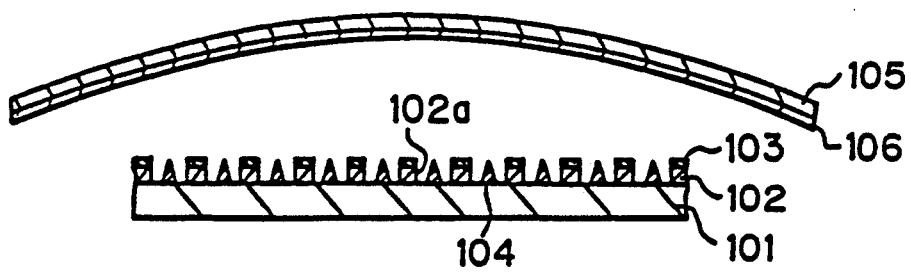
FIG. 2 is a cross sectional view showing an example in which the screen is formed in a spherical shape in a conventional flat panel display.
Figure 3A:
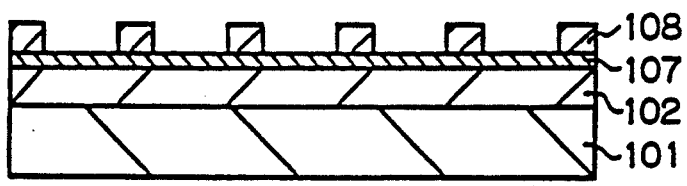
FIG. 3 is a cross sectional view for explaining a conventional manufacturing method of a flat panel display.
Figure 3B:
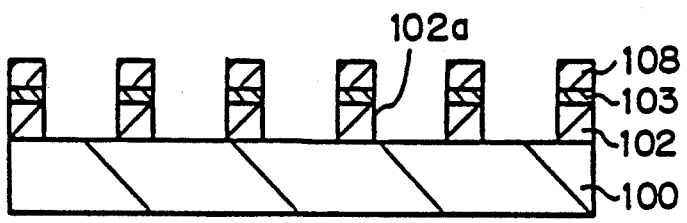
Figure 3C:
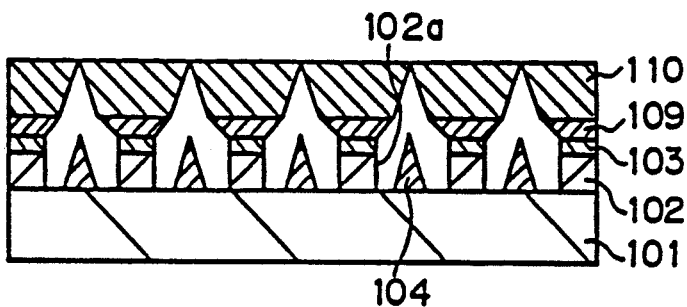
Figure 3D:
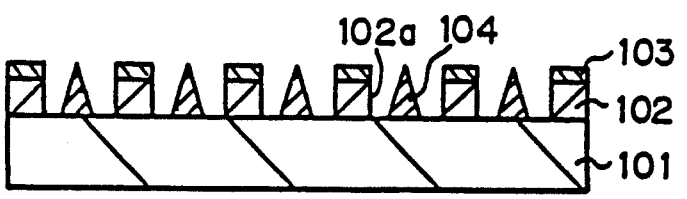
Figure 3E:
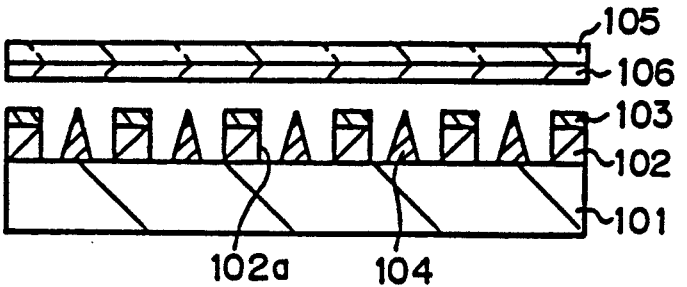
Figure 4:
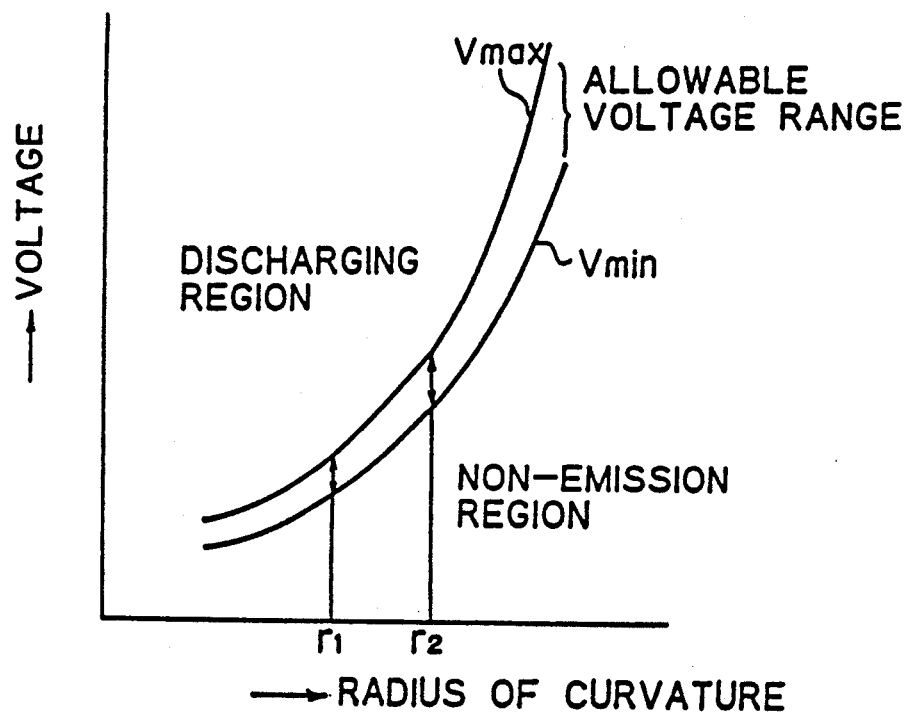
FIG. 4 is a graph showing the relationship between the radius of curvature of the tip of the cathode and the allowable applied voltage to the cathode.
Figure 5:
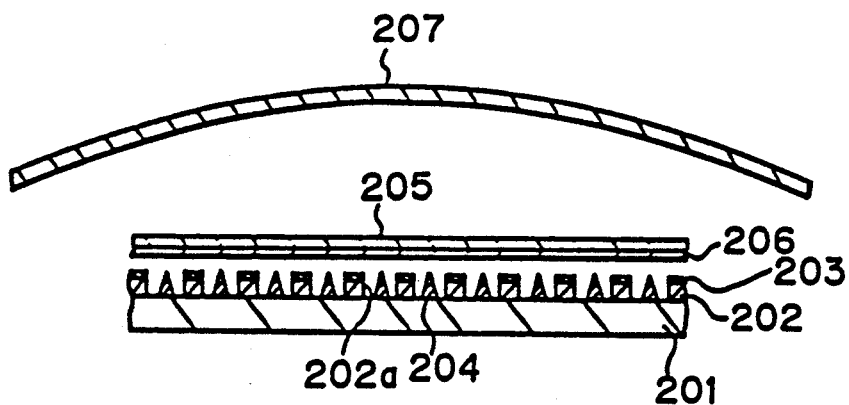
FIG. 5 is a cross sectional view showing a flat panel display according to the first embodiment of the invention.

FIG. 5 is a cross sectional view showing a flat panel display according to the first embodiment of the invention.

As shown in FIG. 5, in a flat panel display according to the first embodiment, an insulating film 202 such as an $SiO_2$, film having cavities 202a is formed, for instance, on a conductive flat Si substrate 201. A gate electrode 203 made of, for example, Mo or Nb is formed on the insulating film 202 in the peripheral portion of the cavity 202a. A cathode 204 made of a microtip is formed on the Si substrate 201 in the cavity 202a. The cathode array is formed by a number of cathodes 204.

In the first embodiment, a fluorescent screen in which a fluorescent material 206 is formed on a glass plate 205 is arranged so as to face the Si substrate 201 on which the cathode array is formed. Further, a spherical glass plate 207 having spherical inner and outer surfaces serving as a screen is provided on the outside of the fluorescent screen. The space between the fluorescent screen and the Si substrate 201 on which the cathode array is formed and the space between the fluorescent screen and the spherical glass plate 207 serving as a screen are held in a vacuum. In the above case, a degree of vacuum of the space between the fluorescent screen and the Si substrate 201 and a degree of vacuum of the space between the fluorescent screen and the spherical glass plate 207 can be set to be either equal or different.

A manufacturing method of the flat panel display according to the first embodiment constructed as mentioned above will now be described.

As shown in FIG. 5, the insulating film 202 such as an SiO2 film is first formed onto the Si substrate 201 by, for instance, a thermal oxidation method, a CVD method, or a sputtering method. After that, a metal film made of, for example, Mo, Nb, or the like to form gate electrodes is formed onto the insulating film 202, by, e.g., a sputtering method or an electron beam evaporation depositing method. Subsequently, a resist pattern (not shown and having a shape corresponding to the gate electrodes to be formed, is formed onto the metal film by a lithography).

By subsequently etching the metal film by a wet etching method or a dry etching method by using the resist pattern as a mask, the gate electrodes 203 are formed. After that, the insulating film 202 is etched by a wet etching method or a dry etching method by using the resist pattern and the gate electrodes 203 as masks, thereby forming the cavities 202a.

After the resist pattern is removed, an oblique evaporation deposition is performed onto the substrate surface from a direction which is inclined by a predetermined angle for the substrate surface by an electrode beam evaporation depositing method, thereby forming a peeling-off layer, made of, for example, Al or Ni, onto the gate electrodes. After that, for instance, Mo as a material to form the cathodes is evaporation deposited onto the substrate surface from the direction perpendicular thereto by an electron beam evaporation depositing method. The cathodes 204, are thus formed on the Si substrate 201 in the cavities 202a.

The peeling-off layer is subsequently removed together with the metal film formed thereon by a lift-off method. The fluorescent screen in which the fluorescent material 206 is formed on the glass plate 205 is arranged so as to face the Si substrate 201 on which the cathode array is formed. Further, the spherical glass plate 207 serving as a screen is arranged on the outside of the fluorescent screen. The space between the fluorescent screen and the glass plate 207 is sealed in a state in which it is held in vacuum, thereby completing a desired flat panel display.

According to the first embodiment as mentioned above, since the screen is formed by the spherical glass plate 207, the flat panel display can be formed as a large screen. Moreover, since both of the spaces on both sides of the fluorescent screen are vacuum, there is hardly a differential pressure between both sides of the fluorescent screen, so that a situation such that a force is applied to the fluorescent screen due to the differential pressure actually does not occur. Thus, even when an area of the fluorescent screen is enlarged to realize a large screen of the flat panel display, no problem occurs with respect to the strength.

In the first embodiment, the screen is formed by the spherical glass plate 207. However, the screen is not always necessary to be formed in a spherical shape. For example, it can be also formed in a cylindrical or other convex curved shape.

The second embodiment of the invention will be described hereinbelow with reference to the drawings.

Figure 6A:
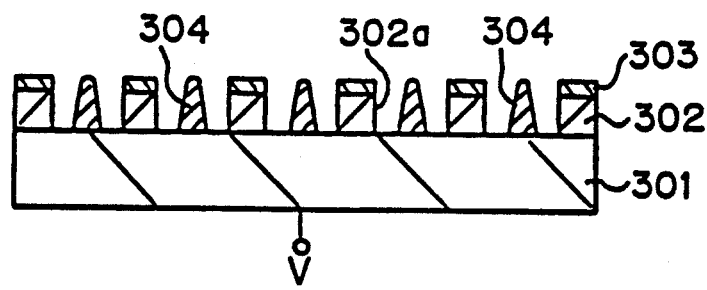
FIG. 6 is a cross sectional view for explaining a manufacturing method of a flat panel display according to the second embodiment of the invention.
Figure 6B:
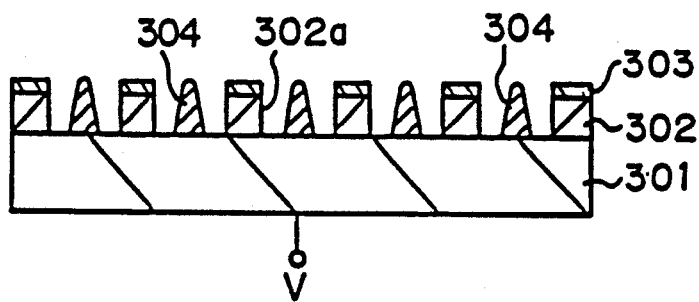
Figure 6C:
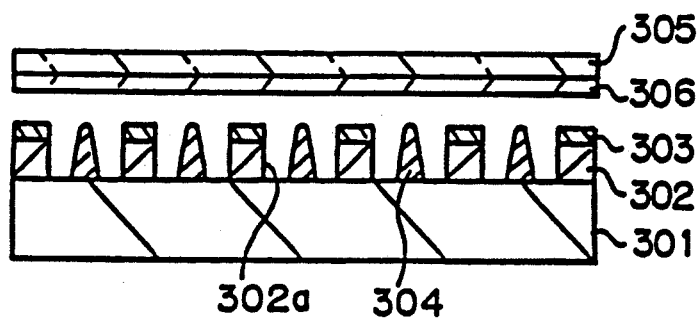

FIGS. 6A to 6C are cross sectional views showing a manufacturing method of a flat panel display according to the second embodiment of the invention.

In the second embodiment, as shown in FIG. 6A, an insulating film 302 such as an SiO2 film having cavities 302a, gate electrodes 303, and cathodes 304 comprising microtips are formed, for example, on a conductive substrate 301 in a manner similar to the conventional manufacturing method of the flat panel display shown in FIGS. 3A to 3E.

Among a number of cathodes 304 formed as mentioned above, it is now assumed that a radius of curvature of the tip of the central cathode in FIG. 6A is set to, e.g., 180 Å and radii of curvatures of the tips of the other cathodes are set to, e.g., 200 Å and the radius of curvature of the tip of only the central cathode is smaller than those of the other cathodes.

In the second embodiment, a voltage V of a polarity opposite to that of the voltage (negative voltage) applied to the cathodes 304 upon operation of the flat panel display, that is the positive voltage V, is first applied to the conductive Si substrate 301 which is electrically connected to all of the cathodes 304. The voltage V is gradually increased to a voltage, e.g., 500 V corresponding to the radius of curvature of the tip of the central cathode from 0 V. Voltage applying means for applying the voltage V is preferably provided in the flat panel display.

When the positive voltage V is gradually applied to the cathode array as mentioned above, in FIG. 6A a field evaporation preferentially starts to occur from the tip of the central cathode whose radius of curvature of its tip is smaller than those of the other cathodes. The radius of curvature of the tip of such a central cathode gradually increases in association with the field evaporation. As shown in FIG. 6B, the radius of curvature of the tip of the central cathode is equal to those of the tips of the other cathodes. That is, the radii of curvatures of the tips of all of the cathodes 304 are aligned to, e.g., 200 Å. After that, when the voltage V is increased to, for instance, 600 V, the current emission starts to occur from all of the cathodes 304. Therefore, the application of the voltage V is stopped at this time point.

After that, as shown in FIG. 6C, a screen in which a fluorescent material 306 is formed on a glass plate 305 serving as a display screen is arranged so as to face the foregoing Si substrate 301 on which the cathode array is formed in such a manner that the fluorescent material 306 is located on the inside. The space between the screen and the Si substrate 301 is sealed in a state in which it is held in vacuum. Due to this, a desired flat panel display is completed.

The above second embodiment relates to the case where only one cathode whose radius of curvature of the tip is small, exists among a number of cathodes 304. However, the similar method can be applied to all of the cases where the radii of curvatures of the tips of the cathodes constructing the cathode array are not equal. In such a case as well, in a manner similar to the above, when the voltage V is applied to the cathode array, the field evaporation sequentially starts to occur from the cathode whose radius of curvature of the tip is small. Finally, the radii of curvatures of the tips of all of the cathodes are made equal.

As mentioned above, according to the second embodiment, by applying the positive voltage V to the cathode array, the field evaporation is preferentially caused from the cathode 304 whose radius of curvature of the tip is small. Therefore, the radii of curvatures of the tips of all of the cathodes 304 constructing the cathode array can be easily made equal at a high accuracy. Thus, unevenness of the luminances of the flat panel display can be eliminated and a flat panel display of a high quality can be realized.

Further, since the field evaporation is caused by applying the positive voltage V to each cathode 304, a contaminant adhered on the surface of the cathode 304 can be eliminated. Thus, a good current emission can be executed from the cathode 304.

Each of the numerical values mentioned in the above second embodiment is merely an example. Those numerical values can be obviously changed as necessary.

The cathode array of the flat panel display according to the second embodiment can be also formed by a method different from that mentioned above. The cathode array may also have a structure different from that in the second embodiment.

In the second embodiment, the Si substrate 301 is used as a substrate of the flat panel display. However, various kinds of conductive substrates other than the Si substrate 301 can be used. For instance, a substrate in which a conductive film such as a metal film is formed on the whole surface of an insulating substrate such as a glass substrate or a ceramics substrate, or is selectively formed on such an insulating substrate, can also an used.

As described above, according to the glass panel display apparatus of the invention, since the screen is formed by the glass plate of the convex curved shape, the screen of the flat panel display can be enlarged. Moreover, since the space between the fluorescent screen and the screen and the space between the fluorescent screen and the substrate are vacuum, even when the area of the fluorescent screen is enlarged in order to realize the large screen, no problem occurs with respect to strength.

According to the method of manufacturing a flat panel display apparatus of the invention, since the field evaporation is caused from the tips of a plurality of cathodes, the radii of curvatures of the tips of all of the cathodes constructing the cathode array can be easily made equal at a high accuracy. As a result, the luminances of the flat panel display can be made uniform.

Although various minor changes and modifications might be proposed by those skilled in the art, it will be understood that I wish to include within the claims of the parent warranted hereon all such changes and modifications as reasonably come within my contribution to the art.

What is claimed is:

1. In a flat panel display apparatus having a cathode array formed on a flat substrate, said cathode array comprising thousands of individual cathode tips on the substrate which tips project through apertures in an insulating layer on the substrate, a gate electrode being formed on a surface of the insulating layer, and a fluorescent screen comprising a fluorescent material layer on a glass plate being arranged opposite the cathode array with the fluorescent layer facing the cathode array, the improvement comprising:

a spherical glass plate screen which is formed by a convex glass plate having spherical inner and outer surfaces, the fluorescent screen being positioned between the spherical glass plate screen and cathode array;

said fluorescent screen being flat; and a space between the flat fluorescent screen and the spherical glass plate screen and a space between the fluorescent screen and the substrate comprising a vacuum.

2. An apparatus according to claim 1 wherein the vacuum between the flat fluorescent screen and the spherical glass plate is the same as the vacuum in the space between the fluorescent screen and the substrate.

3. An apparatus according to claim 1 wherein the vacuum in the space between the flat fluorescent screen and the spherical glass plate screen is different than the vacuum between the space between the flat fluorescent screen and the substrate.

* * * * *